United States Patent [19]

Hällgren

[11] 4,244,422
[45] Jan. 13, 1981

[54] METHOD AND DEVICE FOR DEFROSTING HEAT EXCHANGER WITHOUT IMPAIRMENT OF ITS HEAT EXCHANGE EFFICIENCY

[75] Inventor: Karl Hällgren, Huddinge, Sweden

[73] Assignee: Aktiebolaget Carl Munters, Sollentuna, Sweden

[21] Appl. No.: 947,856

[22] Filed: Oct. 2, 1978

Related U.S. Application Data

[63] Continuation of Ser. No. 741,462, Nov. 12, 1976, abandoned.

[51] Int. Cl.³ .............................................. F28F 17/00
[52] U.S. Cl. ........................................ 165/1; 165/101; 165/DIG. 12
[58] Field of Search .................. 165/98, 95, 135, 101, 165/DIG. 12, 17, 1

[56] References Cited

U.S. PATENT DOCUMENTS

| 2,766,968 | 10/1956 | Blizard | 165/101 X |
| 3,224,842 | 12/1965 | Manske | 165/135 X |
| 3,618,659 | 11/1971 | Rawal | 165/1 |
| 3,716,097 | 2/1973 | Kelb et al. | 165/98 X |
| 3,963,070 | 6/1976 | Alley | 165/98 |
| 3,980,129 | 9/1976 | Bergdahl | 161/1 X |

FOREIGN PATENT DOCUMENTS 1476716  3/1967  France .................................... 165/101

*Primary Examiner*—Albert W. Davis
*Attorney, Agent, or Firm*—Eric Y. Munson

[57] ABSTRACT

Method and device for defrosting or deicing heat exchangers of the type in which a stream of warm, moist gas, such as warm, used ventilating air—so-called exhaust air—exchanges heat with a cooler medium, such as incoming fresh air, in a contact apparatus, and in which the two media flow through a large number of parallel layers separated from each other by thin walls.

7 Claims, 3 Drawing Figures

METHOD AND DEVICE FOR DEFROSTING HEAT EXCHANGER WITHOUT IMPAIRMENT OF ITS HEAT EXCHANGE EFFICIENCY

This is a continuation of application Ser. No. 741,462, filed Nov. 12, 1976 now abandoned.

BACKGROUND OF THE INVENTION

In so-called recuperative heat exchangers of the type described above, a stream of moist, warm so-called exhaust air, as from a room or building, is cooled by a cool stream of fresh air or the like, the two streams exchanging heat without coming in direct contact. As the cooling stream of fresh air or similar cooling medium absorbs heat from the exhaust air, and as the temperature of the latter falls, moisture condenses on the heat exchange surfaces of the exhaust air channels. Especially in the colder season, this often results in the formation of frost or ice in the channels through which the exhaust air passes, thus greatly reducing the efficiency of the heat exchanger and in severe cases blocking the channels.

SUMMARY OF THE INVENTION

The principal objective of the invention is to eliminate this inconvenience and bring about a method and arrangement for deicing or defrosting that part of the heat exchanger body through which the exhaust air passes.

A more specific object of the invention is to bring about a method and arrangement for continuous defrosting of the heat exchanger while keeping the latter in more or less full service. The invention makes it possible to defrost a small number of channels while all the remaining channels are in service for heat exchange, so that continuous operation of the exchanger and constant pressure gradient and flow rate can be maintained.

Another important feature of the present invention makes it possible to dimension the heat exchanger for better efficiency than is obtainable from exchangers which do not provide continuous defrosting, without having to shut down the apparatus at low outside temperatures. In non-defrosted exchangers, efficiency has to be kept down in order to prevent the cooled air from becoming too cold and depositing excessive amounts of frost. The defrosting method and defrosting arrangement proposed by the invention will allow for very low external temperatures. By means of the regular defrosting cycle, the layer of frost can be kept so thin at all times that it has no appreciable effect on heat exchange and the pressure gradient. Hence, such a heat exchanger can be dimensioned for better operating economy than an exchanger without defrosting means.

Another object of the invention is to provide a heat exchanger defrosting apparatus which is of simple design and can be fitted on the heat exchanger without any special modification of the heat exchanger body. The invention makes it possible to provide defrosting by means located outside the heat exchanger body and not requiring any modification of the latter. Hence the heat exchanger body may be of standardized type, suitable for exchangers with or without defrosting means, which results in reduced cost of manufacturing the exchanger body.

These and other objects and advantages inherent in the invention are achieved by imparting to the method and apparatus the characteristics described in the claims.

DESCRIPTION OF THE SPECIFIC EMBODIMENTS

Figure 1:
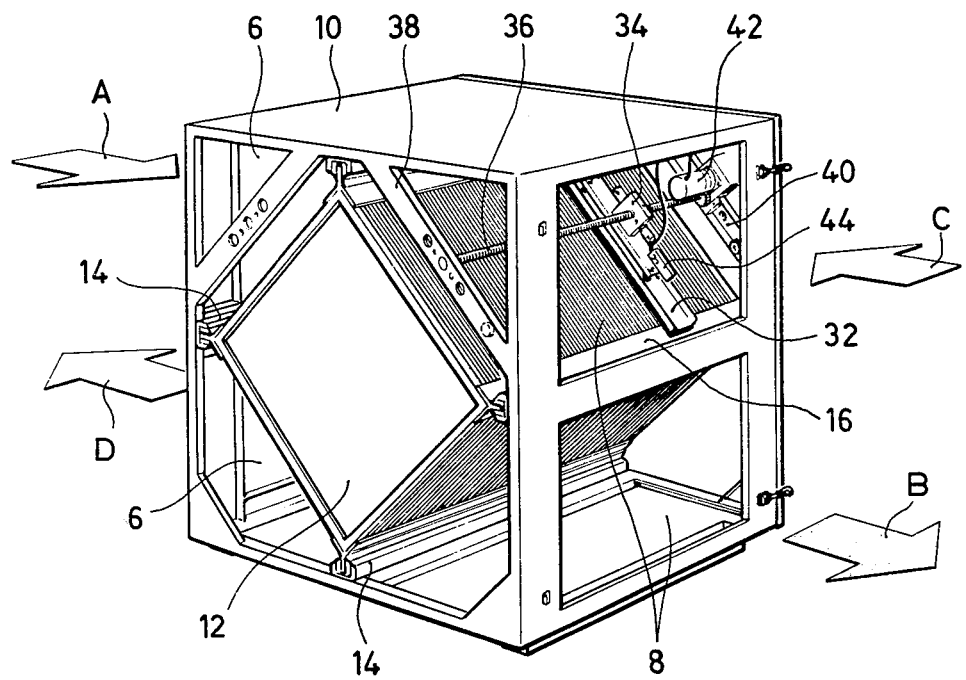
FIG. 1 is a perspective view of a heat exchanger equipped with a defrosting arrangement in accordance with the invention.
Figure 2:
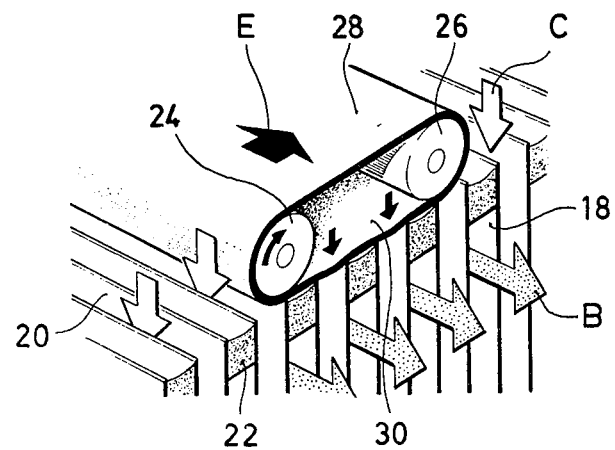
FIG. 2 shows a detail of the arrangement drawn to a larger scale.

The regenerative heat exchanger shown in FIG. 1 consists of a frame 10 comprising beams and panels, which can have openings 6, 8 for the entry and exit of the heat exchange media, in the present case air. The frame 10 encloses a heat exchanger body 12, comprising a number of separate layers, e.g. such as described in copending U.S. application No. 705,536 filed July 15, 1976, now U.S. Pat. No. 4,099,928. The individual layers of the body 12 may be creased or corrugated to form channels for the passage of the heat exchange media, the corrugations of alternate sheets being parallel and crossing the corrugations in the interjacent sheets at an angle. The edges of the sheets are joined to form alternately open and closed channels on each side of the body, thus forming two systems of channels at an angle to each other, through which two separate air streams can be conducted into and out of the body without coming in direct contact with each other. In the embodiment shown, for example, a stream of warm, moist exhaust air, such as used air from a room, is introduced at arrow A, and flows through the heat exchange body 12 obliquely downwards and to the right in the Figure, to leave the body at arrow B. At the same time, a stream of cool air, such as fresh air, is introduced from the opposite direction at arrow C, and flows through the body in the opposite direction to the first stream, leaving it at arrow D. Thus, as the two streams pass through the heat exchanger body 12, heat exchange can take place between them without mixing the two streams. The heat exchanger body 12 is fixed in U-shaped supporting strips 14 in the housing 10 by means of Y-shaped sealing strips 16 or similar means. FIG. 2, representing a detail of the heat exchanger in FIG. 1, shows that each alternate channel 18 of the heat exchanger body is sealed along its upper edge but open at the sides, so that the exhaust or room air, after being cooled by contact with the cool air, passes out to the right of the figure, as indicated by the arrows B. The intermediate channels 20, which are sealed at the sides but open at the top, conduct a vertical downward stream of cool, fresh air as indicated by the arrows C. As described in detail in the aforementioned copending application, the channels may be sealed by crimping, gluing, soldering, welding the edges, or filling the space between them with a compound, or similar means, but are shown schematically in FIG. 2 as being sealed by filling with a compound 22.

Under certain conditions of temperature and humidity of the two air streams, the cooling of the warm air causes condensation of moisture in the exhaust air channels of the exchanger body 12. During the cold season, this resuls in the formation of frost and ice in these channels to such an extent that the channels may actually be blocked. The invention contemplates defrosting or deicing the heat exchanger by periodically screening off and closing some of the cool air channels from the incoming air so that the warm air passing through the adjacent warm air channels is no longer cooled, but warms the heat exchange surfaces of the frosted channels and melts the ice in these channels. In the embodiment shown, the channels are closed off by means of a baffle device consisting of two rollers 24, 26 and an endless band 28 passing about and tensioned by the rollers, with its lower part 30 bearing on the upper side of the heat exchanger body 12, i.e. the side from which the cool air enters the channels 20. As indicated symbolically by the arrows in FIG. 2 pointing towards the lower part 30 of the band, the baffle device 24, 26, 28, 30 bears with a certain pressure on the surface of the heat exchanger body 12. Adequate sealing pressure may be obtained from the weight of the baffle device. If, as in the example, the baffle device lies on the cold air inflow side, and the closed-off channels 20 are in communication with the cold air outflow side, where the air pressure is lower than at the inflow, this pressure difference will add to the bearing pressure, thus actively contributing to satisfactory contact between the lower part 30 of the band and the openings of the channels. With its lower part 30 covering the channel openings, the baffle device advances in the direction of the arrow E (or the reverse direction), as also indicated by the arrow on the roller 24, thus moving across the surface of the entire body at a given, predetermined rate. In this way, as the baffle device passes over them, a number of cool air channels—three in the embodiment shown—will be closed off from the cool air C, and hence the heat exchange surfaces will be heated by the warm air passing through the channels 18 so that any ice or frost will melt and drain out of the exhaust air channels in question.

As shown in FIG. 1, the baffle device is mounted on a supporting beam 32 or similar means, which extends across the entire width of the cool air intake (C) side of the heat exchanger body 12 and also, in the embodiment shown, across the sealing strips 16. On the beam 32 is mounted a bracket 31 having a tapped hole traversed by a threaded, rotating rod or screw 36 which is supported at either end of the heat exchanger body in oblique strips 38, 40 integral with the housing 10. The threaded rod 36 is rotated by a motor 42, and as it rotates it moves the beam 32, and with it the baffle device 24, 26, 28, 30, back and forth across the surface of the heat exchanger body 12. To change the direction of motion of the baffle or roller device, magnetic, photoelectric, or similar limit switches 44 may be fitted which change the direction of rotation of the motor 42, and hence of the screw 36, when the roller device reaches one end of the heat exchanger body. Naturally, devices of other types can be fitted to bring about the reciprocating movement of the roller device, e.g. double-threaded screws or similar means. It is clear that the speed of rotation of the screw 36 and hence the motion of the baffle device will be adapted to the conditions of operation of the heat exchanger in question, but that they may also be adjustable through the use of a motor 42 having variable speed or of a gear between the motor 42 and the screw 36.

Figure 3:
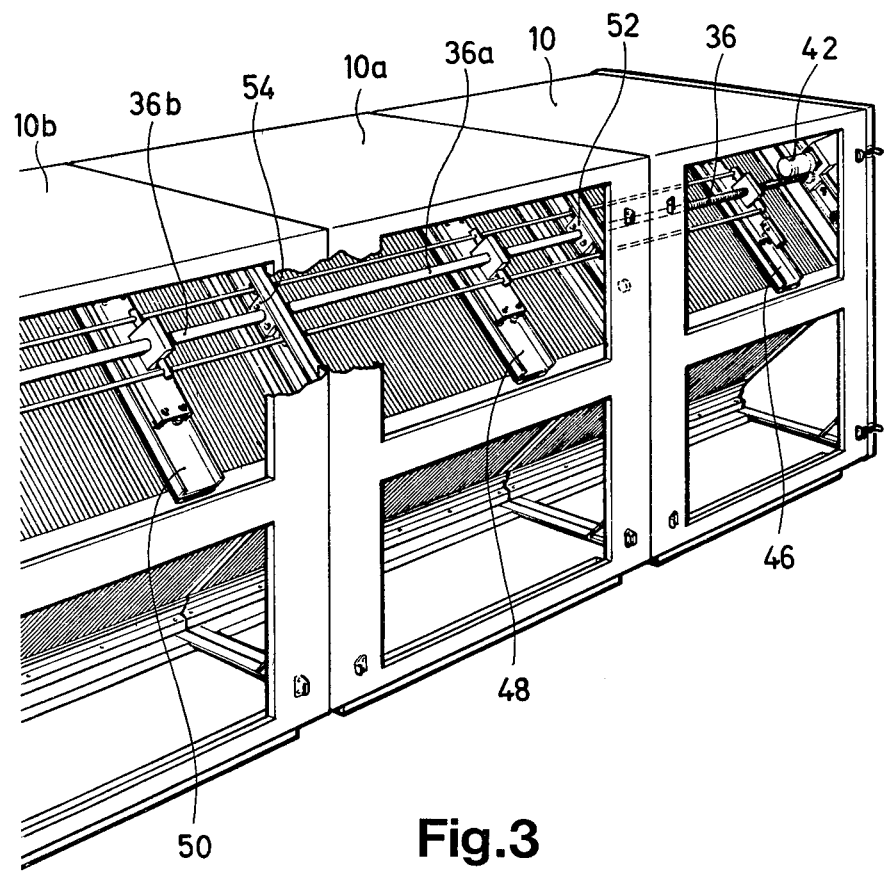
FIG. 3 is a perspective drawn to a somewhat larger scale than FIG. 1, of a heat exchanger installation consisting of a number of heat exchanger bodies equipped with defrosting means in accordance with the invention.

As shown in FIG. 3, it is possible to use an assembly of a number of heat exchanger bodies, in which case, in the embodiment shown, two more housings 10a and 10b will be attached to the housing 10 shown in FIG. 1. Each heat exchanger 10-10b is provided with its own baffle device 46, 48, 50, which in the embodiment shown are driven by a common driving motor 42 via the screw 36 and further screws 36a, 36b connected to the latter, screws 36a, 36b being supported in brackets 52, 54 at the points where they pass from one heat exchanger body to the next.

The invention is naturally not limited to the forms of embodiment shown, but can be varied within the terms of the basic concept. For example, the baffle device 28-30 may be of some other suitable design if desired, although the design shown results in a satisfactory and reliable closure of the channels which are desired to be closed off from the air supply. The details of the design of the baffle device 24, 26, 28, 30 and the material used for the rollers 24, 26 and for the endless band 28, 30 will naturally vary depending on the environment and conditions of operation in which the heat exchanger 12 is used. The same applies, as mentioned above, to the speed at which the baffle device must be driven in order to ensure satisfactory deicing and defrosting of the exhaust air channels.

Although the invention has been described, in connection with the embodiment shown, with a baffle or closure device located on the cool air intake side, the device can equally well be located on the outlet side of the system of cool air channels. Furthermore, instead of the band device, shown and presented as an example only, the device for closing off the channels may include a system of flaps, shutters, or similar means.

Likewise, although the invention has been described, in connection with the embodiment shown, with heat exchange taking place between two gas streams, such as air, it is also conceivable that the exchanger be intended for the exchange of heat between a cool liquid, e.g. ethylene glycol solution, and a warm, moist gas stream. In this case, the channels or slots 20 in FIG. 2 will be supplied with cool liquid instead of cool air by means of appropriate liquid dispersion means (not shown). The liquid exchanger body should then be oriented so that the direction of flow indicated by arrows C is vertical, in which case the defrosting means 28-30 can still function in essentially the form shown.

I claim:

1. In the method of defrosting a heat exchanger without substantial impairment of the thermodynamic exchange efficiency of the exchanger, which comprises a pack of facially opposed heat exchange surfaces defining therebetween a plurality of open-ended channels in which a stream of relatively cold medium is passed through one set of channels in heat exchange relationship with a stream of relatively warm medium passed through another set of channels, which channels terminate in an inlet surface area and an outlet surface area for the respective sets of channels which surface areas extend across said pack, the improvement comprising:

continuiusly controlling the proportions of the two streams by blocking off a portion of the surface area for the cold medium to periodically interrupt the flow of cold medium through at least one cold medium channels at a time along the surface area of said blocked off portion in response to environmental thermodynamic conditions while maintaining the flow of warm medium through the set of warm medium channels uninterrupted to heat the exchange surfaces of the frosted channels so as to maintain the channels free of ice without substantially impairing the thermodynamic exchange efficiency thereof.

2. The combination of a heat exchanger comprising a pack of facially opposed heat exchange surfaces defining therebetween a plurality of open-ended channels in which a stream of relatively cold medium is passed through one set of channels in heat exchange relationship with a stream of relatively warm medium passed through another set of channels, which channels terminate in an inlet surface area and an outlet surface area for the respective sets of channels, which surface areas extend across said pack; with a defrosting device comprising means for continuously controlling the proportions of the two streams by blocking off a portion of the surface area for the cold medium to periodically interrupt the flow of cold medium through at least one cold medium channel at a time along the surface area of said blocked off portion in response to environmental thermodynamic conditions while allowing uninterrupted flow of warm medium through the set of warm medium channels to heat the exchange surfaces of the frosted channels effective to maintain said channels free of ice without impairment of the thermodynamic exchange efficiency thereof.

3. The combination of claim 2, in which said control means comprise baffle means reciprocating across one of the surface areas for the cold medium channels.

4. The combination according to claim 3, in which said baffle means comprises an endless belt rotating about a pair of pulleys.

5. The combination of claim 4, in which the heat exchanger has a generally parallelepiped configuration mounted diagonally within a rectangulr frame in which the baffle means are reciprocated by means of a reversible-drive motor to reverse the movement of the baffle means upon each transversal of the surface area.

6. The combination of claim 5, in which the reversible-drive motor is actuated by the baffle means upon the end of each course of travel.

7. The combination of claim 6, comprising a plurality of heat exchanger units arranged in a series having individual baffle means mounted on a shaft common to all of said units and driven by a common motor.

* * * * *

UNITED STATES PATENT OFFICE
CERTIFICATE OF CORRECTION

Patent No. 4,244,422    Dated January 13, 1981

Inventor(s) Karl Hallgren

It is certified that error appears in the above-identified patent and that said Letters Patent are hereby corrected as shown below:

[30] Foreign Application Priority Data

November 18, 1975    Sweden ........ 7512960-1

Signed and Sealed this

Nineteenth Day of May 1981

[SEAL]

Attest:

RENE D. TEGTMEYER

Attesting Officer    Acting Commissioner of Patents and Trademarks